US007613771B2

(12) United States Patent
Rivers et al.

(10) Patent No.: US 7,613,771 B2
(45) Date of Patent: *Nov. 3, 2009

(54) COMPUTER NETWORK AND METHOD OF OPERATING SAME TO PRELOAD CONTENT OF SELECTED WEB PAGES

(75) Inventors: Scott Alexander Rivers, Hemel Hempstead (GB); Julian Michael Palmer, Edinburgh (GB)

(73) Assignee: 3Com Corporation, Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/200,084

(22) Filed: Aug. 28, 2008

(65) Prior Publication Data

US 2009/0063669 A1 Mar. 5, 2009

Related U.S. Application Data

(62) Division of application No. 10/465,282, filed on Jun. 19, 2003, now Pat. No. 7,433,918.

(30) Foreign Application Priority Data

Sep. 2, 2002 (GB) ................................. 0220361.0

(51) Int. Cl.
*G06F 15/16* (2006.01)
(52) U.S. Cl. ........................ 709/203; 709/213; 709/229; 709/238; 709/242; 715/700; 715/853; 345/661
(58) Field of Classification Search .................. 709/203, 709/213, 229, 238, 242; 715/700, 853; 345/661
See application file for complete search history.

(56) References Cited

U.S. PATENT DOCUMENTS 5,805,442 A 9/1998 Crater et al.

(Continued)

FOREIGN PATENT DOCUMENTS

WO 01/67296 A2 9/2001

OTHER PUBLICATIONS

3Com Press Release, http://www.3com.com/corpinfo/en_US/pressbox/press_release.jsp?INFO_ID=140362, Jan. 15, 2003.
International Search Report for GB0020361.0, Feb. 28, 2003.

*Primary Examiner*—Jinsong Hu

(57) ABSTRACT

A method for operating a computer network for example a school to preload the content of web addresses on the local memory, i.e. the web cache memory for use in for example a subsequent lesson. The network comprises at least one device, a web cache memory, and internet access apparatus to connect a device on the network to internet using a web browser, relevant devices on the network being accessible to a network administrator and defined network users (teachers and pupils), a method whereby one of said defined network users (teachers) uses a modified web browser to define a set of web addresses (web pages) to be accessed, said set of web addresses being stored in the network, and operates the network to cause the content of the set of web addresses to be stored on said web cache memory, whereby the content may be accessed by the pupils during said lesson via the network without further access to internet. Limits or quotas may be set up for the amount of memory space usable by each user so as to prevent overload of the memory and users may be limited to access web pages defined by one or more preload tasks on the memory at a particular time. Software to allow the method of the invention may be loaded on the web cache.

12 Claims, 4 Drawing Sheets

U.S. PATENT DOCUMENTS

| | | |
|---|---|---|
| 5,975,737 A | 11/1999 | Crater et al. |
| 5,982,362 A | 11/1999 | Crater et al. |
| 5,991,306 A | 11/1999 | Burns et al. |
| 6,061,603 A | 5/2000 | Papadopoulos et al. |
| 6,151,625 A | 11/2000 | Swales et al. |
| 6,282,454 B1 | 8/2001 | Papadopoulos et al. |
| 6,484,061 B2 | 11/2002 | Papadopoulos et al. |
| 6,587,884 B1 | 7/2003 | Papadopoulos et al. |
| 6,640,140 B1 | 10/2003 | Lindner et al. |
| 6,732,191 B1 | 5/2004 | Baker et al. |
| 6,782,436 B1 | 8/2004 | Baker |
| 6,801,920 B1 | 10/2004 | Wischinski |
| 6,853,867 B1 | 2/2005 | Klindt et al. |
| 6,959,318 B1 * | 10/2005 | Tso .......................... 709/203 |
| 6,961,633 B1 | 11/2005 | Marbach et al. |
| 6,963,898 B2 * | 11/2005 | Yoshimine et al. .......... 709/203 |
| 7,010,762 B2 * | 3/2006 | O'Neil ....................... 715/853 |
| 2003/0085927 A1 * | 5/2003 | Muller ....................... 345/810 |
| 2003/0195940 A1 * | 10/2003 | Basu et al. .................. 709/213 |
| 2004/0068579 A1 * | 4/2004 | Marmigere et al. ......... 709/242 |
| 2005/0021796 A1 * | 1/2005 | McClain et al. ............. 709/229 |

* cited by examiner

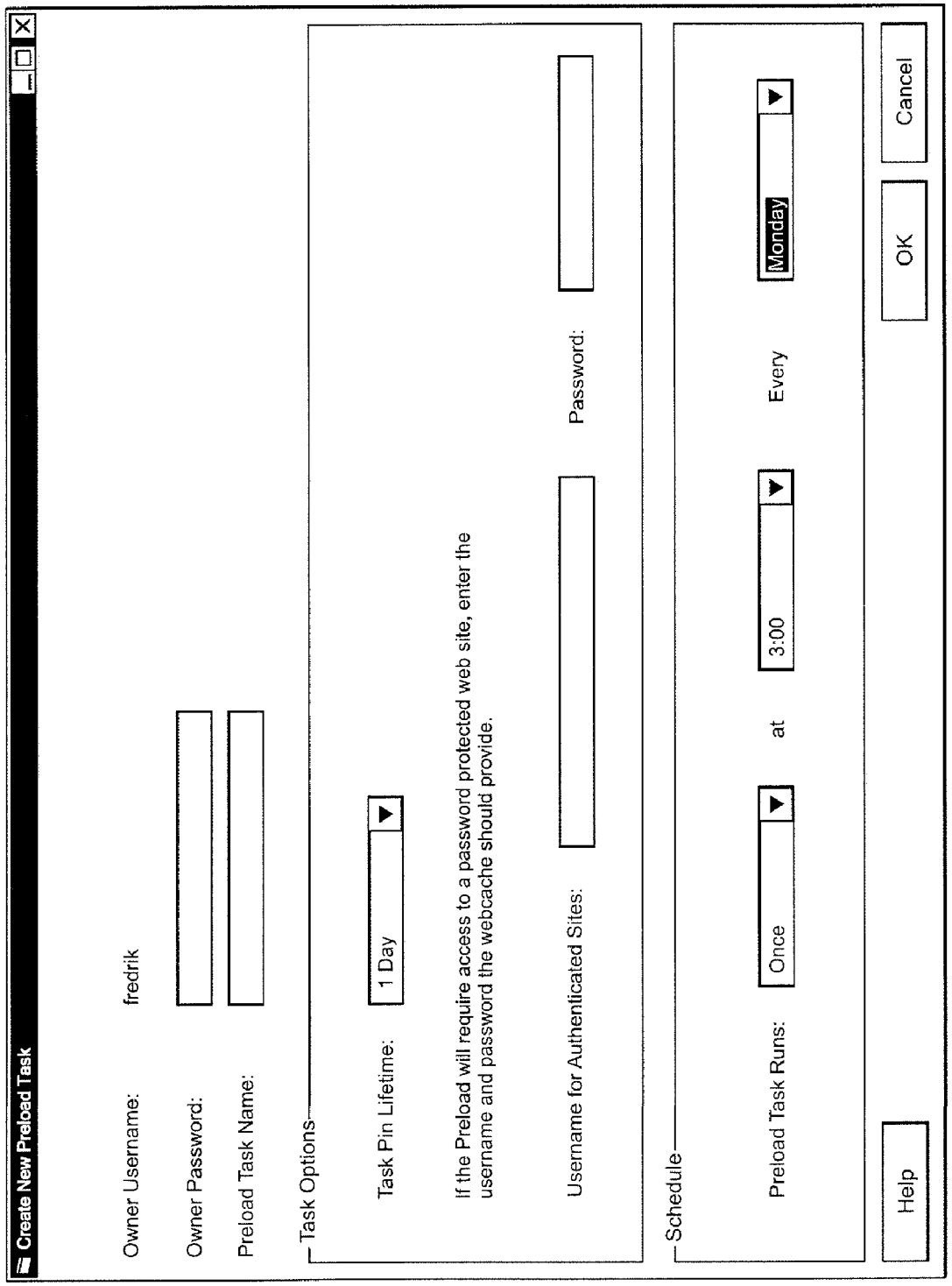

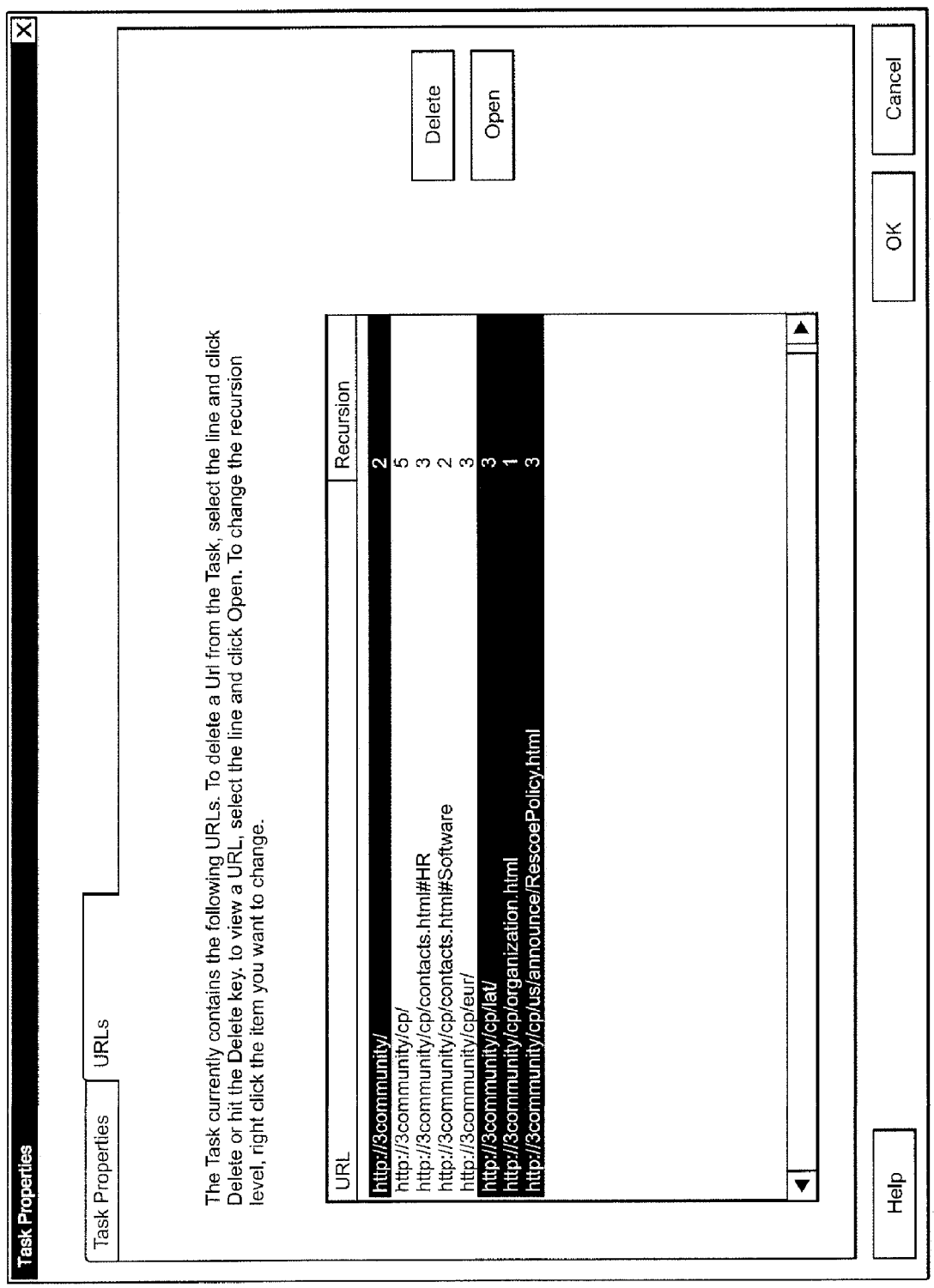

COMPUTER NETWORK AND METHOD OF OPERATING SAME TO PRELOAD CONTENT OF SELECTED WEB PAGES

RELATED APPLICATION

This application is a Divisional of U.S. application Ser. No. 10/465,282, filed on Jun. 19, 2003, now U.S. Pat. No. 7,433,918 herein incorporated by reference.

BACKGROUND

The present invention relates to a computer network and method of operating same to preload content of selected web pages. The present invention relates to improvements in or relating to HTTP proxy caches or other similar caching mechanisms based on HTTP or other network protocols used for retrieval of internet content, hereafter referred to as web cache memories, and methods of operating web cache memories used in a network of electronic devices, and a method of preloading web cache memories with the content of selected web pages (URLs).

The network comprises a group of electronic devices comprising, for example, work stations, personal computers, servers, hubs, routers, bridges, switches (hereinafter refer to as "devices" of the network), and links between these devices, which may be in form of physical cable or wireless links. The network may be a local area network (LAN), such as an Ethernet network, a wide area network (WAN), or other types, including wireless networks and may operate in accordance with any desired network protocol.

As it is well known, many computer networks include web cache memories attached to the internet whereby the content of web pages, which are accessed from the internet by users of the network, may be stored temporarily in the web cache memory so that when they are re-accessed by the same or different user, perhaps a short time later, it is not necessary to access the internet but the content may be downloaded immediately to the user from the web cache memory. This reduces the amount of external data traffic on the system and speeds up access.

In some network environments there are particular problems. We will illustrate this by reference to a school or college environment but similar problems will be present in other network environments.

In the case of school or college, there may be a limited usable network capacity from the network to the internet. Certainly there is, rarely if ever, sufficient usable network capacity to the internet to satisfy a requirement for a large number of pupils to access the internet at the same time with acceptable latency.

When faced with this situation, one option is to improve the network capacity/performance to the internet. This may be prohibitively expensive however. An alternative is to deploy a web cache memory or similar device to avoid repeating requests having to traverse the network link. While this helps, the first request made for any web page will still suffer the same latency and bandwidth problems.

SUMMARY OF THE INVENTION

A solution to this problem would be for the required web pages to be retrieved and stored on the web cache memory prior to the first request. The retrieval and storage of the web pages may be done automatically out of hours under the control of a scheduled task, thus avoiding the need for a user to select the web page with a browser such as Internet Explorer or Netscape. Such a retrieval is known as an offline activity. The use of an offline task to retrieve web content and store it on a web cache memory is referred to as a "preload".

Consider a teacher with a classroom of many students trying to access the internet. The teacher will wish to ensure there is no delay from the network. The teacher may also want to limit the web pages the students can access to only those to be used for the lesson to avoid students misusing the lesson time.

A web cache memory can be used to restrict access to specific web pages for particular sets of users. A preload can be used to ensure there is little or no delay.

In teaching it is desirable for the pupils to be able to access the information which is available on internet but for the teacher to define in some way the web pages which will be used by the pupils for the lesson.

A simple type of preload could be carried out by the teacher giving to a network administrator (a network administrator is defined as a person responsible for administering the network by means of unique passwords and privileges, to carry out operations on the network which are not allowed to other users of the network) a list of websites, the contents of which the teacher wishes the pupils to be able to access during a particular lesson, on a particular day and at a particular time. The network administrator would at a time convenient to him/her configure the web cache memory to download the content and store it whereby the teacher and pupils can access the contents of those web pages during the lesson without the need to access the internet.

The network administrator could, in fact, set up the systems so that the relevant content from the websites are automatically downloaded at a convenient time (i.e. not in real time) but perhaps when the network and internet are quiet in the middle of the night.

One of the difficulties in this arrangement is that the teacher does not have direct control of the procedure. For example, sometimes the teacher will wish to change the websites, perhaps just before the lesson, perhaps by adding or removing some of those websites. In the arrangement described above, this can only be done by the network administrator.

It would be desirable to allow an ordinary user, for example, a teacher in the above example, to define the websites required and to be able to operate such a procedure without the intervention of the network administrator. As the teacher may not be as knowledgeable of the details of the network as the network administrator, it is clearly desirable that such a system should be as user friendly and non-technical as possible.

Another difficulty is to try to ensure the web cache memory is not fully consumed with preloaded web pages. If large numbers of web pages are retrieved and stored, then at any one time the total amount to be stored may be excessive. This may either prevent retrieval of further web pages, or cause the web cache memory to discard web pages that it has preloaded. Either result will mean the web pages will not be available when required with no latency as intended.

The present invention provides, according to a first aspect, in a computer network comprising internet access apparatus to connect the network to internet, a local network memory (e.g. a local web cache memory), a network administrator and other network users (i.e. the teacher in the example above), a method of allowing one of said other network users to define a set of web pages to be accessed and the content to be stored on said local memory, whereby the content may be accessed via the network without further access to internet.

The present invention also provides, in a computer network comprising at least one device, a local network memory, and internet access apparatus to connect a device on the network to internet using a web browser, relevant devices on the network being accessible to a network administrator and other defined network users, a method including the steps of one of said defined network users operating the network to define a set of web addresses (web pages) to be accessed, store said set of web addresses in the network, access the internet to download the content of the set of web addresses, store said downloaded content on said local network memory, whereby the downloaded content may be accessed via the network without further access to internet.

The invention further provides, in a computer network comprising at least one device including a device memory, a local network memory, and internet access apparatus to connect a device on the network to internet using a web browser, relevant devices on the network being accessible to a network administrator and other defined network users, a method including the steps of providing on a device a specific toolbar and/or dialog, entering details of a schedule using said specific toolbar and/or dialog, accessing internet using browser and searching for the desired web pages, saving the addresses of selected web pages on said device memory, exporting the saved addresses to the local network memory, accessing the web addresses in the saved list and saving the content of those web addresses on the local network memory, allowing one or more other defined network users to access the content stored on the local network memory without access to internet.

Said method may allow said other users (i.e. teachers) to define the set of websites via a modified web browser. The modification may comprise installing in the web browser a further tool bar for use in operating the method of the invention. Such an arrangement allows, for example, in the example given above, a teacher to determine the web pages required for a lesson and to store the list in the web cache memory so that they can be preloaded by the web cache memory according to a schedule defined by the teacher, and subsequently used in a lesson by a number of pupils.

The use of a web browser tool bar allows simple access and operation of the method of the invention without detailed technical knowledge or administrator access to the web cache memory.

The method includes the steps of defining a point in time at which the web pages should be available on the web cache memory, which might include a start time, and a finish time. In practice it may be preferred to define the start time and, by means of a pin rule defines the period of time for which that information is retained on the local memory.

The start time may be set to be late at night, for example, when the network and internet system has a time determined, for example, by the network administrator, which may, for example, be late at night when the network and internet are quiet to access the websites to download the relevant pages of information on to the local memory.

The method may include the step of allowing the user to re-access the list of web pages comprising the preload task from the web cache memory, and to modify that list of web pages, the schedule for the preload task or the pin time for the preload task in real time as required. The method may allow the user to define a recursion level for each web page. By recursion level we mean, a first recursion level is all of the links which appear on the defined web page, a second recursion level is all of the web pages linked to the web pages in the first recursion level etc.

The method may include the step of allowing the user to view the web content and/or other details (such as the run time statistics) stored on the local memory and to modify the web page list in real time, as required.

The method may include the step of requiring the user to insert necessary identification and passwords to allow downloading of the web pages stored on the local memory.

The invention provides according to a further aspect, a computer program which may be provided in the form of a disc or other physical medium, or which may be downloaded via internet, which provides the steps of the method of the invention.

The invention provides according to a further aspect, a network including the program as aforesaid.

BRIEF DESCRIPTION OF THE DRAWINGS

Preferred embodiments of the invention will now be described by way of example only and with reference to the accompanying drawings in which:—

FIG. 3 shows a dialog, that is a picture on the screen of a workstation of the user for use in creating or preloading a task, and FIG. 4 shows a dialog, that is a picture on the screen of a workstation of the user listing the web pages selected.

DESCRIPTION OF THE PREFERRED EMBODIMENTS OF THE INVENTION

Figure 1:
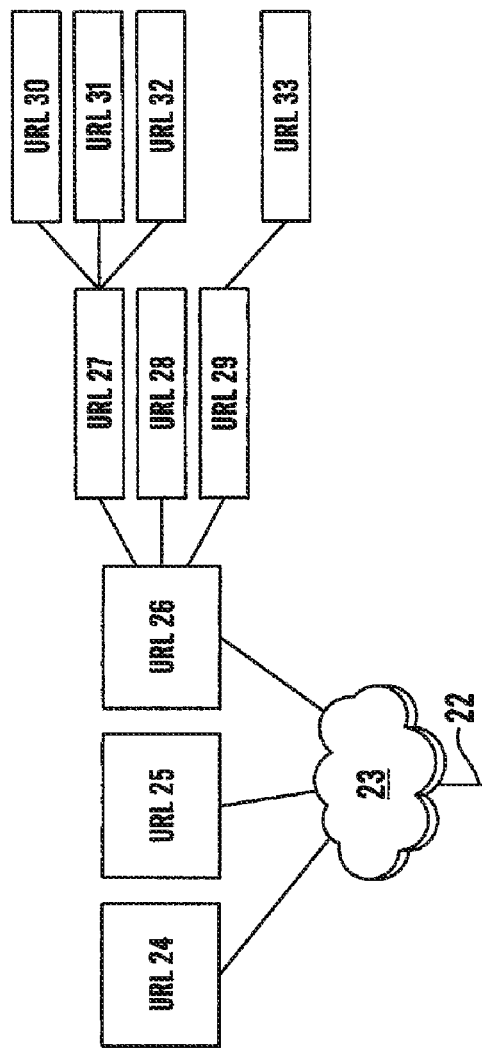
FIG. 1 is a diagrammatic view of a network for use with the invention.
Figure 1:
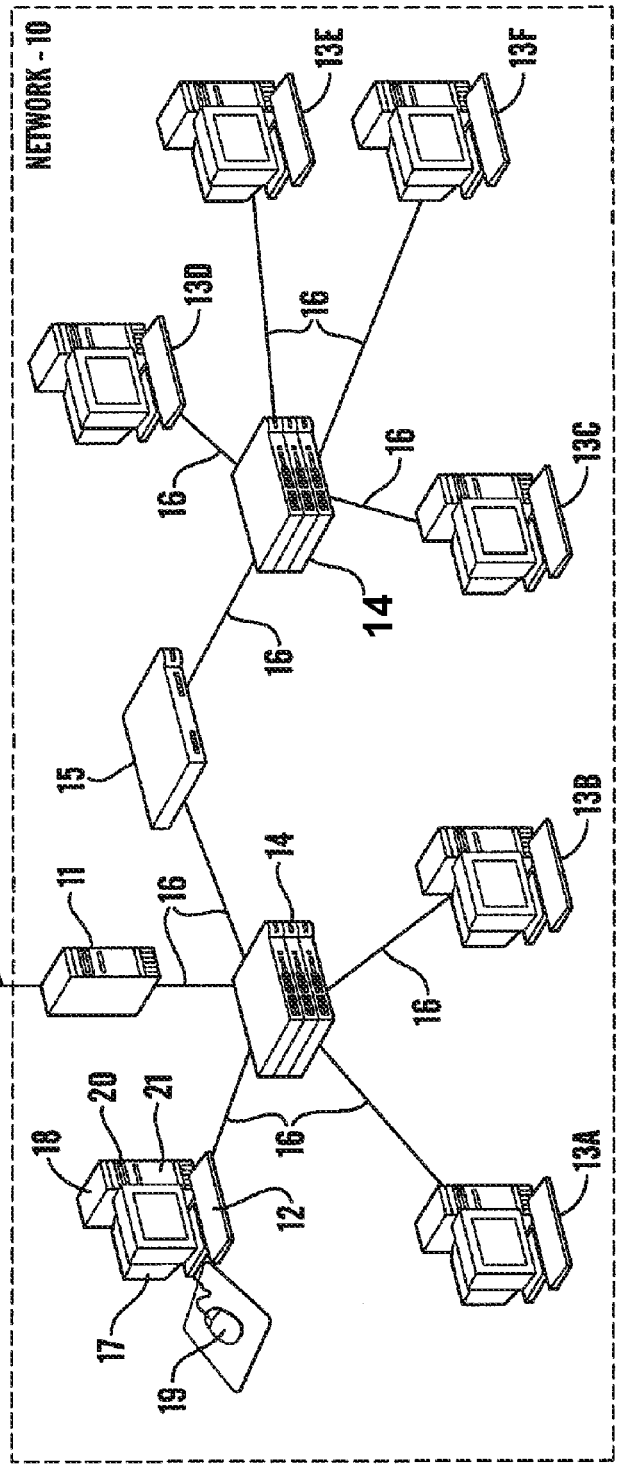

Referring to FIG. 1, there is shown a network 10. The network 10 includes a web cache memory, 11 which is usually provided with a hard disk drive.

The network includes a workstation 12 for use by the network administrator, and workstations 13A-13C for use by other users. The network of FIG. 1 will be described with reference to an educational establishment but is not restricted to that use. Thus, the users using workstations 13A-13C may be teachers.

Pupils in a class belonging to the teacher of workstation 13B may use workstations 13D-13F. The web cache memory 11, workstations 12-13F, switches 14, hubs 15, will be referred to as devices and are connected by means of links 16, which in the example illustrated are hard-wired and may utilise any desired network protocol, but which may alternatively be wireless links.

The network shown is for illustrative purposes only and is diagrammatic. Other configurations and arrangements may be used as will be readily apparent to one skilled in the art.

Some or all of the workstations includes a visual display unit 17, a central processing unit 18, a selector which may be in the form of a mouse 19, a program store 20, which may be in the form of a CD drive, a floppy disc drive, or a zip drive, and a memory 21 for storing a program which may have been loaded from the program store 20 or downloaded, for example, via internet from a website.

The network 10 may be connected by an external link 22 (a modem to a telephone line or cable line or other networking means including wireless) to internet 23 and hence to websites 24-33. 24 and 25 are stand-alone websites, 26-29 websites having links to websites 27-29. Website 27 has links to websites 30-32, and website 29 has a link to website 33. The websites 26-28 are defined as having a recursion level of 1 from website 26. The websites 30-33 are defined as having a recursion levels of 2 from website 26.

In a typical application, each of the workstations 12,13A-13G may include (in the form of loaded software) a web browser such as Microsoft Internet Explorer, or Netscape. The preferred description will relate to a Microsoft Internet Explorer system but potentially the same principle applies to other web browsers.

In a school, the prior, known, system may operate as follows. A teacher with access to work station 113B, accesses internet 23 via the web cache memory 11, and using the web browser seeks out web pages, which are of interest for a particular lesson. The addresses (the URL addresses) of these websites, 24-33, are passed to the network administrator, who, having access to work station 12 is informed and he/she arranges for the content of those web pages to be downloaded from internet 23 and stored on the web cache memory 11. As already described this may be done at any convenient time up to the time which the teacher requires the information for a particular lesson. Essentially each page is stored on the web cache memory hard disc. In addition the web cache keeps an index of all the web pages it has on its memory, that is on its associated hard disc. When a request arrives at the web cache, the web cache scans its index to see if it has the page. If it does, it retrieves it from its stored version on its disc and returns it to the requesting browser.

During the course of the lesson, the teacher 13B and the pupils with access to work stations 13D-13G, have access using their web browsers to the downloaded content of the web pages 24-33 as stored on the web cache memory 11. Clearly different pupils may be accessing different parts of the content and sometimes more than one pupil will be accessing the same content and this requires some considerable bandwidth between the web pages 24-33 and the pupils. It would potentially be impractical due to latency and bandwidth limitations, for all content to be fetched from the internet 23 via link 22. By storing the relevant content on the web cache memory 11 it is possible for a large number of pupils to access a restricted number web pages from the web cache memory, at high speed and without unacceptable latency.

There are a number of difficulties with such an arrangement. The network administrator 12 is key to the process and it would probably be better if the teacher using workstation 13B could directly access via internet, the relevant pages and organise their preload and storage on the web cache memory 11, download them, or at least organise their downloading onto the web cache memory 11 without the intervention of the network administrator. However, controlling the network to do this has hitherto been complex and this is why the task is restricted to that of the network administrator.

Furthermore, we will describe a method to control overcommitment of the cache. We will provide "per-user quotas" for web content. The web cache memory has the concept of a user who can define content. In our example it is a teacher. For each teacher the network administrator configures the web cache memory to define a maximum amount of content (in bytes) that the teacher may have preloaded into the web cache memory at any time. This is known as the users preload quota. At any time the user has an amount of web content that has been preloaded and is being stored. This amount is known as the users preload quota usage. As the preload task executes and retrieves web pages, the system charges the size of the retrieved web pages to the preload quota usage for the user who has configured the preload task. If storing the content would exceed the users preload quota at the time of retrieval, the web page is not stored in the web cache memory and the preload task terminates with an error.

An additional aspect to this is that the web cache memory must keep track of when a preloaded web page has been stored in cache for its guaranteed pin time. When this occurs, the preload quota usage for the user that caused the web page to be preload is credited with the size of the web page. The web page may optionally be discarded by the web cache memory at that time, or may be discarded when the web cache memory must recover storage space to bring in new web pages.

The network administrator may modify the preload quota for a user at any time, or may monitor the quota usage for any one or all users defined on the web cache memory.

According to the preferred embodiment of the invention disclosed herein, the workstation 13B (and also other teacher work stations 13A, 13C) include modifications to their web browsers, which include a new tool bar. Thus in order to organise this, they are supplied with a program in a physical form such as a CD, or floppy disc, or alternatively downloaded via internet, via the web cache 11 on each of the work stations 13A-13C. The additional tool bar is illustrated in FIG. 2.

Figure 2:
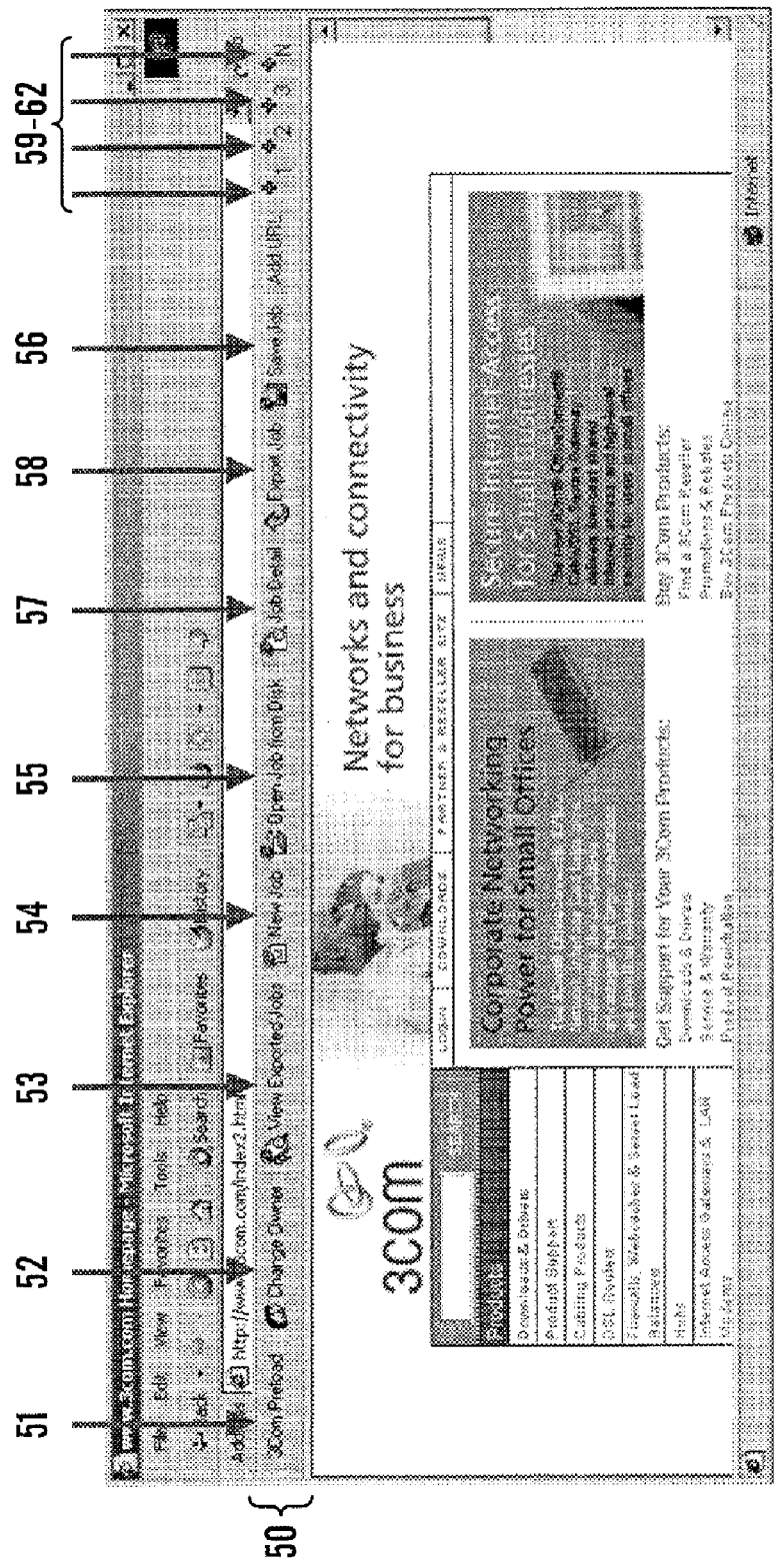
FIG. 2 shows an additional tool bar for use with the invention.

FIG. 2 shows the information on the top part of the screen of the relevant VDU of the workstations 13A-13C when the teacher has selected "Microsoft Internet Explorer". The upper tool bar and other features are common to the normal version of Microsoft Internet Explorer. The difference is provided in the tool bar 50, which includes icons 51-63 labelled as follows:—

51. "3 Com Preload"
52. Change Owner
53. View Exported Jobs
54. New Job
55. Open Job From Disc
56. Save Job
57. Job Detail
58. Export Job
59. (Recursive level) 1
60. (Recursive level) 2
61. (Recursive level) 3
62. (Recursive level) N Icons 52-55 are used in the task selection and creation, icons 56-58 are used in task control, and icons 59-62 are used to add web pages.

FIG. 3 shows the dialog shown on the screen of the workstation of the teacher when the icon 54 is selected and FIG. 4 shows the dialog shown on the screen of the workstation of the teacher when the icon 57 is selected. The dialog of FIG. 3 has boxes for completion by the user as follows.

Box 301 for user to enter a user password.
Box 302 for user to enter a name for the preload task.
Box 303 for user to enter the task pin lifetime.

If the preload task requires access to a password protected web site, then the user uses box 304 to enter the relevant username and box 305 to enter a password.

Box 306 for user to enter the number of preload task runs.
Box 307 for user to enter the time of the preload task run.
Box 308 for user to enter frequency of preload task runs (i.e. when it is to be repeated).

In use of the apparatus and program of the invention, a user (e.g. a teacher) will go through a sequence like this to create a new preload task and have it executed:

a) Create a new task. Define the name/schedule/pin via the dialog of FIG. 3.

b) Browse the internet to discover web pages he/she wants to preload within this task. Add the web pages via the toolbar buttons.

c) View the web pages he/she has added to the task via the dialog of FIG. 4. Make any corrections.

d) Save the preload task to the local hard drive.

e) Do something else.

f) Reopen the task saved locally and add some more web pages to the task, by selecting icon 55.

g) Save the preload task locally to the hard drive of his/her workstation (just for safety) by selecting icon 56.

h) Export the preload task to the web cache memory by selecting icon 58. This will cause the task to be scheduled. Up until now, the web cache has been ignorant of the task.

i) Wait until the task should have executed.

j) View the task log to see if the task succeeded. If it hasn't, fix the task for the next run. If it has, the content should be ready.

Note that until the task is exported to the web cache memory, the web cache has no information about the task and so it cannot schedule it (i.e. carry out the step of accessing the web pages and downloading their content).

The task is stored locally (on the memory, that is the hard drive of the users workstation) until it is complete to allow users to make changes without storing temporary versions on the web cache memory.

In detail, the teacher (user) may carry out the following steps:—

Step 101: Open (by selecting icon displayed on Windows tool bar, tool bar 50 now displayed)
Step 102: Is the owner to be changed?
Step 103: If yes, on toolbar 50 select icon 52.
Step 104: On dialog enter user ID.
Step 105: On dialog, enter password.
Step 106: Is it a new task?
Step 107: If no, go to an existing job by selecting icon 55
Step 108: If yes, on toolbar 50, select icon 54.
Step 109: On dialog of FIG. 3, enter task name.
Step 110: On dialog of FIG. 3, enter task pin lifetime.
Step 111: If the preload (task) will require access to a password protected website, on dialog enter the user name and password the web cache should provide.
Step 112: On dialog, enter details of schedule, that is, if the task is to be run more than once, enter the number of times, the time, and the frequency.
Step 113: (Either list a known web page or) Access internet using browser in normal way and search for web pages desired.
Step 114: Does user wish to add web page displayed without any recursive level?
Step 115: If yes, go to step 124.
Step 116: Does user wish to add the displayed web pages, at recursive level 1?
Step 117: If yes, select icon 59 and go to Step 124
Step 118: Does user wish to add the displayed web pages, at recursive level 2?
Step 119: If yes, select icon 60 and go to Step 124
Step 120: Does user wish to add the displayed web pages, at recursive level 3?
Step 121: If yes, select icon 61 and go to Step 124
Step 122: Does user wish to add the displayed web pages, at recursive level N?
Step 123: If yes, select icon 62 insert value of "N" and go to Step 124
Step 124: Does user wish to save task?
Step 125: If yes, select icon 56 and save task to teacher's workstation memory.
Step 126: If ok, select icon 58 and Export the task to the web cache memory (hard disc)

This then saves the completion of the task. The details of the web pages which are to be accessed are stored on the web cache memory, and also on the workstation memory, and subsequently, at a time determined by the teacher, under the control of the information saved on the web cache memory, the web cache automatically accesses the relevant web pages over internet, and downloads the content of the web pages onto the web cache memory. The web page addresses (URLs) of the content on the web cache memory which is mentioned above, are written to a log file specific to the preload task that has been executed so that the teacher can readily access the log file when necessary to determine whether the task ran successfully.

At a later period of time, typically before the due start of the lesson during which the information is to be used, the teacher will open the task from the web cache memory and view the preload task log file to ensure the content has been preloaded (and, if necessary carry out any modifications). Thus, the following two steps are then carried out:

Step 127: Does user wish to open task from web cache memory?
Step 128: If yes, select icon 53 and view contents of the preload log.

Selecting icon 55 opens the dialog of FIG. 4 on the screen of the workstation of the teacher.

The teacher can then delete web pages that are no longer required in the preload task, or that represent broken links, by selecting them. The teacher can also edit the location of a web page (its URL) or its recursion level by double clicking it in the list, or add a new web page by clicking an Add button on the toolbar. It will be the teacher's responsibility to ensure the web pages they enter/modify do exist. For example, the teacher may know the address of the web page without having to search on internet and this may be entered via the browser directly on to the web cache memory under the relevant task number without accessing the internet.

The above steps relate to the searching for suitable web pages and saving of the contents of those web pages on to the web cache memory.

We have thus described a method for operating a computer network in, for example, a school, to preload the content of web addresses on the local memory. i.e. the web cache memory, for use in for example a subsequent lesson. The network comprises at least one workstation, a web cache memory, and internet access apparatus to connect a device on the network to internet using a web browser, relevant devices on the network being accessible to a network administrator and defined network users (teachers and pupils), a method whereby one of said defined network users (teachers) uses a modified web browser to define a set of web addresses (web pages) to be accessed, said set of web addresses being stored in the network, and operates the network to cause the content of the set of web addresses to be stored on said web cache memory, whereby the content may be accessed by the pupils during said lesson via the network without further access to internet.

The method and apparatus of the preferred embodiment of the invention limits the students' access to only the web pages the teacher requires for the lesson. This avoids the students wasting time by just browsing the internet, rather than performing the tasks assigned to them. The system works by having each student and teacher identified to the web cache memory. As part of defining the preload task, the teacher will identify a set of students (this may be a class) who will be restricted to only the web pages that comprise the preload task for a specified period of time. This will normally be the duration of a lesson (a few hours at most). When the student accesses the internet for the first time within the lesson period, they will be identified by a username and password challenge. The web cache memory will then determine if the student is only allowed restricted access to a given set of pages from a preload task. If so, and the student strays outside the boundaries of that set of web pages, the request will be denied by the web cache memory.

Limits or quotas may be set up for the amount of memory space usable by each user so as to prevent overload of the web cache memory.

Thus the method and apparatus of the preferred embodiment of the invention provides a specific quota or amount of memory space usable by each user (teacher) for storing web pages. The quotas may be specified by the network administrator. The network administrator configures the web cache memory to define a maximum amount of content (in bytes) that a defined teacher may have preloaded into the web cache memory at any time. This is known as the users preload quota. At any time the user has an amount of web content that has been preloaded and is being stored. This amount is known as the users preload quota usage. As the preload task executes and retrieves web pages, the system charges the size of the retrieved web pages to the preload quota usage for the user who has configured the preload task. If storing the content would exceed the users preload quota at the time of retrieval, the web page is not stored in the web cache memory and the preload task terminates with an error.

This may be provided by providing the following steps before step 124 above.

Step 124*a* How many bytes (x) are the web pages to be stored?

Step 124*b* How many bytes (y) remain in the users preload quota?

Step 124*c* Is y>x?

Step 124*d* If yes, go to step 124. If no, provide error message and abort.

Alternatively, the last step may include an algorithm whereby if y is not larger than x, it searches to see if, at the time defined for the lesson, y will be greater than x (some stale web pages being due to be deleted before that time) and if it is, works back as far as possible whilst y remains greater than x to find a convenient time when the web pages may be accessed and loaded onto the web cache memory.

Software to provide the steps of the method of the invention may be loaded on the web cache and the or each workstation running the web browser, and may be provided in the form of a physical medium such as a disc or may be downloaded from a website via the internet.

The invention is not restricted to the details of the foregoing example.

The invention claimed is:

1. A computer network comprising at least one device, a local network memory, and internet access apparatus to connect a device on the network to internet using a web browser, relevant devices on the network being accessible to a network administrator and other defined network users, means whereby one of said defined network users may operate the network to define a set of web addresses (web pages) to be accessed, means whereby one of said defined network users may store said set of web addresses in the network, means whereby one of said defined network users may access the internet to download the content of the set of web addresses, means whereby one of said defined network users may store said downloaded content on said local network memory, whereby the downloaded content may be accessed via the network without further access to internet.

2. In a computer network comprising at least one device, a local network memory, and internet access apparatus to connect a device on the network to internet using a web browser, relevant devices on the network being accessible to a network administrator and other defined network users, a method including the steps of one of said defined network users operating the network to:

(a) define a set of web addresses (web pages) to be accessed (b) store said set of web addresses in the network, (c) access the internet to download the content of the set of web addresses, (d) store said downloaded content on said local network memory, whereby the downloaded content may be accessed via the network without further access to internet.

3. A method as claimed in claim 2 in which the defining step includes defining the set of web addresses by the use of a modified web browser.

4. A method as claimed in claim 3 in which some or all of the steps of the method are carried out by the use of a modified web browser which provides a specific tool bar and/or dialog on a visual display unit of a device used by said one defined network user.

5. A method as claimed in claim 4 including using the specific toolbar and/or dialog to determine the web addresses required and to store the set of web address on the network memory.

6. A method as claimed in claim 3 including the step of further users accessing the content of those web addresses stored on to the local network memory.

7. A method as claimed in claim 3 including the step of the network administrator defining the time to download the relevant content on to the local memory.

8. A method as claimed in claim 3 including the step of downloading the content of web pages linked from an initial web address together with the content of that initial web address.

9. A method as claimed in claim 8 including the step of the user defining a recursion level for each web address.

10. A method as claimed in claim 3 including the step of the user accessing the web content stored on the local memory and modifying the set of web addresses stored in real time, as required.

11. A method as claimed in claim 3 including the step of said one of the defined network users providing necessary identification and passwords to limit accessibility to the set of web addresses stored on the local network memory.

12. In a computer network comprising at least one device, a local network memory, and internet access apparatus to connect a device on the network to internet using a web browser, relevant devices on the network being accessible to a network administrator and other defined network users, a method including the steps of one of said defined network users operating the network to:
   (a) define, by use of a modified web browser, a set of web addresses (web pages) to be accessed,
   (b) store said set of web addresses in the network,
   (c) access the internet to download the content of the set of web addresses,
   (d) store said downloaded content on said local network memory,
   whereby the downloaded content may be accessed via the network without further access to internet, and
   the step of defining a time at which the content is to be available on the local memory, said definition including a start time, or a start time and a finish time, or a start time and a period thereafter.

* * * * *